US012720297B2

(12) United States Patent
Das et al.

(10) Patent No.: US 12,720,297 B2
(45) Date of Patent: Aug. 25, 2026

(54) NON-PERFORMANCE FACTOR AWARE ADAPTIVE BEST ACCESS

(71) Applicant: QUALCOMM Incorporated, San Diego, CA (US)

(72) Inventors: Soumya Das, San Diego, CA (US); Xinchen Zhang, San Diego, CA (US); Mohammad Nekoui, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 354 days.

(21) Appl. No.: 18/506,958

(22) Filed: Nov. 10, 2023

(65) Prior Publication Data

US 2025/0159460 A1 May 15, 2025

(51) Int. Cl.
*H04W 8/18* (2009.01)
*H04W 28/08* (2023.01)

(52) U.S. Cl.
CPC ......... *H04W 8/18* (2013.01); *H04W 28/0958* (2020.05)

(58) Field of Classification Search
CPC ... H04W 8/18; H04W 28/0958; H04W 8/183; H04W 4/80; H04W 36/304
See application file for complete search history.

(56) References Cited

U.S. PATENT DOCUMENTS

2020/0359278 A1* 11/2020 Dhanani ................. H04W 4/80
2022/0353774 A1* 11/2022 Agarwal ............. H04W 36/304
2023/0071751 A1* 3/2023 Zhao ................. H04M 1/72448

* cited by examiner

*Primary Examiner* — Khoa Huynh
(74) *Attorney, Agent, or Firm* — Procopio, Cory, Hargreaves & Savitch LLP

(57) ABSTRACT

Apparatus, methods, and computer program products for determining a preferred data subscription for data service are provided. An example method may include establishing a connection with a network based on a first subscriber identity and a second subscriber identity. The example method may further include communicating with the network based on the first subscriber identity based on the first subscriber identity being a preferred data subscription. The example method may further include determining to recommend to switch the preferred data subscription to the second subscriber identity based on a utility function based on one or more performance factors and one or more non-performance factors. The example method may further include using the second subscriber identity as the preferred data subscription for data service associated with the UE.

12 Claims, 9 Drawing Sheets

One Frame (TDD)
10 ms
200
subframe
RB
slot
OFDM symbol
slot
subcarrier
DMRS R
CSI-RS 230
PDCCH CORESET
SSS
PSS
PDSCH
PBCH
REG 12 REs
1 CCE = 6 REGs
SS/PBCH Block
BWP
BWP
20 RBs
channel bandwidth RBs One Frame (TDD)
10 ms
250
subframe
RB
slot
OFDM symbol
slot
SRS
subcarrier
SRS Comb 0
SRS Comb 1
DMRS R

280
PUCCH
PUSCH

400

500

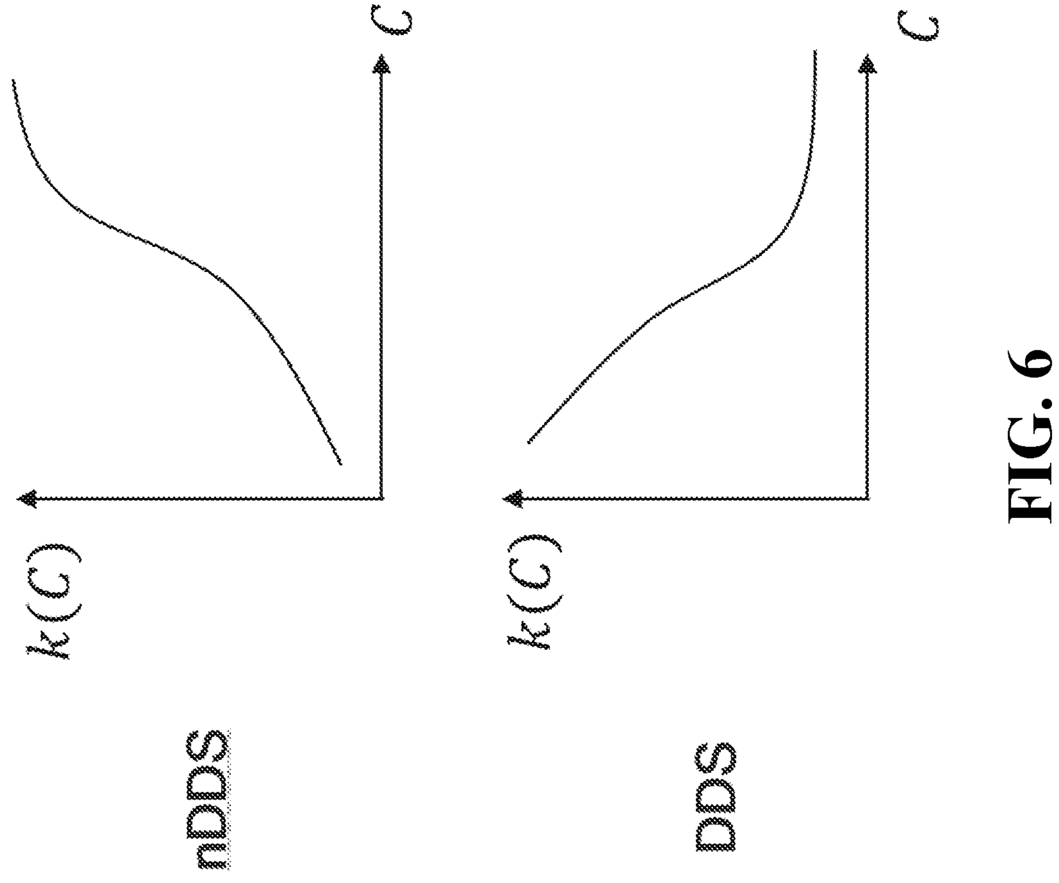
FIG. 6

NON-PERFORMANCE FACTOR AWARE ADAPTIVE BEST ACCESS

TECHNICAL FIELD

The present disclosure relates generally to communication systems, and more particularly, to wireless communication systems where user equipments (UEs) may be able to switch subscriber identity.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus at a user equipment (UE) are provided. The apparatus may include at least one memory and at least one processor coupled to the at least one memory. Based at least in part on information stored in the at least one memory, the at least one processor, individually or in any combination, is configured to establish a connection with a network based on a first subscriber identity and a second subscriber identity. Based at least in part on information stored in the at least one memory, the at least one processor, individually or in any combination, is configured to communicate with the network based on the first subscriber identity based on the first subscriber identity being a preferred data subscription. Based at least in part on information stored in the at least one memory, the at least one processor, individually or in any combination, is configured to determine to recommend to switch the preferred data subscription to the second subscriber identity based on a utility function based on one or more performance factors and one or more non-performance factors. Based at least in part on information stored in the at least one memory, the at least one processor, individually or in any combination, is configured to use the second subscriber identity as the preferred data subscription for data service associated with the UE.

To the accomplishment of the foregoing and related ends, the one or more aspects include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 6 is a diagram illustrating a fifth example utility function, where the horizontal axis represents the projected throughput and the vertical axis represents the calculated utility.

DETAILED DESCRIPTION

Figure 1:
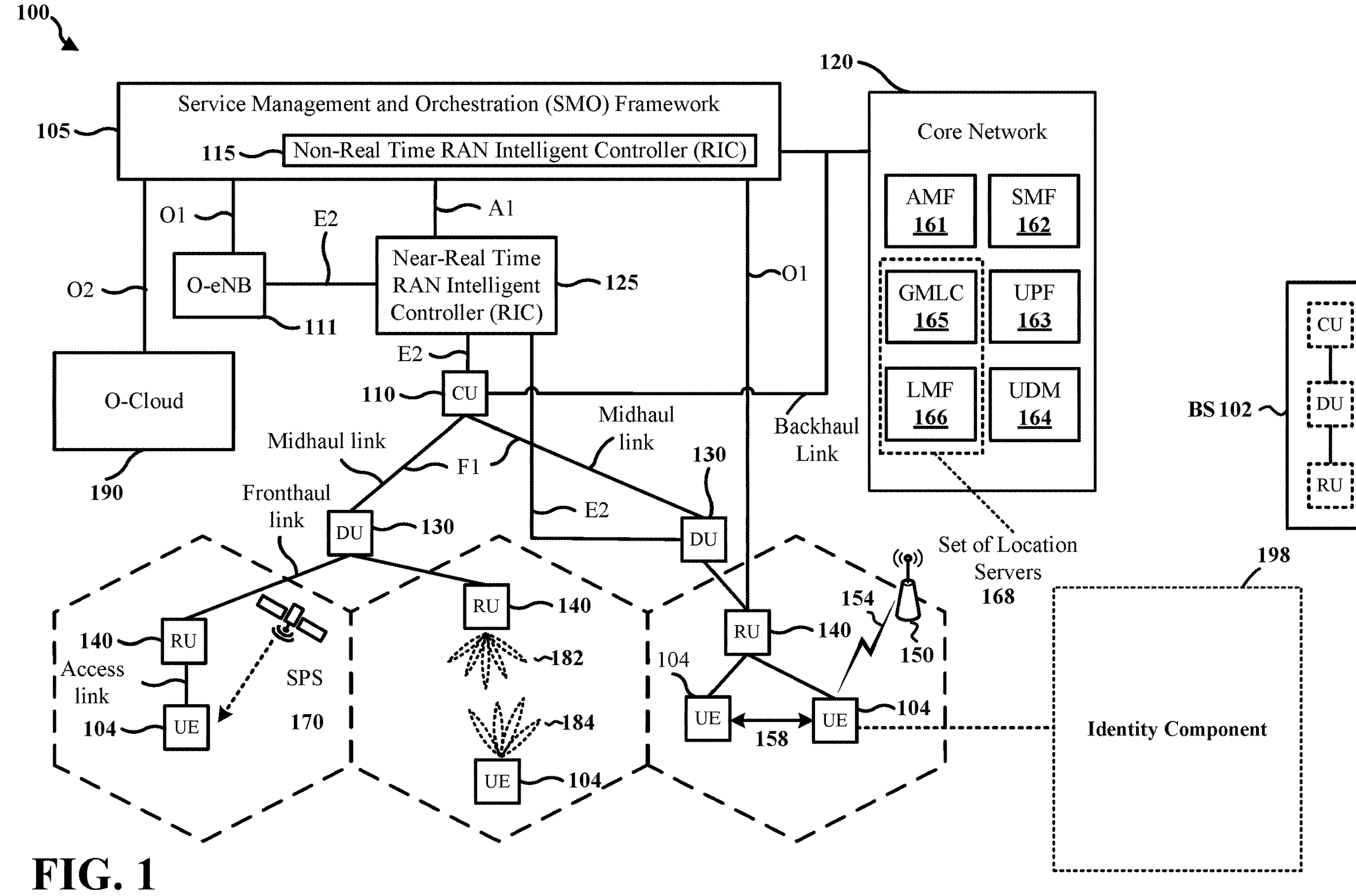
FIG. 1 is a diagram illustrating an example of a wireless communications system and an access network.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Aspects provided herein enables switching preferred data subscription based on both performance factors and non-performance factors to determine the appropriate preferred data subscription, which may result in better performance at the user equipment with non-performance factors factored in.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (cNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHZ (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHZ-7.125 GHZ) and FR2 (24.25 GHz-52.6 GHZ). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHZ. For example, three higher operating bands have been identified as frequency range designations FR2-2 (52.6 GHZ-71 GHZ), FR4 (71 GHZ-114.25 GHZ), and FR5 (114.25 GHZ-300 GHz). Each of these higher frequency bands falls within the EHF band.

With the above aspects in mind, unless specifically stated otherwise, the term "sub-6 GHz" or the like if used herein may broadly represent frequencies that may be less than 6 GHZ, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, cNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in some aspects, the UE 104 may include an identity component 198. In some aspects, the identity component 198 may be configured to establish a connection with a network based on a first subscriber identity and a second subscriber identity. In some aspects, the identity component 198 may be further configured to communicate with the network based on the first subscriber identity based on the first subscriber identity being a preferred data subscription. In some aspects, the identity component 198 may be further configured to determine to recommend to switch the preferred data subscription to the second subscriber identity based on a utility function based on one or more performance factors and one or more non-performance factors. In some aspects, the identity component 198 may be further configured to use the second subscriber identity as the preferred data subscription for data service associated with the UE.

Although the following description may be focused on 5G NR, the concepts described herein may be applicable to other similar areas, such as LTE, LTE-A, CDMA, GSM, and other wireless technologies.

As described herein, a node (which may be referred to as a node, a network node, a network entity, or a wireless node) may include, be, or be included in (e.g., be a component of) a base station (e.g., any base station described herein), a UE (e.g., any UE described herein), a network controller, an apparatus, a device, a computing system, an integrated access and backhauling (IAB) node, a distributed unit (DU), a central unit (CU), a remote/radio unit (RU) (which may also be referred to as a remote radio unit (RRU)), and/or another processing entity configured to perform any of the techniques described herein. For example, a network node may be a UE. As another example, a network node may be a base station or network entity. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE is configured to receive information from a base station also discloses that a first network node is configured to receive information from a second network node, the first network node may refer to a first UE, a first base station, a first apparatus, a first device, a first computing system, a first set of one or more one or more components, a first processing entity, or the like configured to receive the information; and the second network node may refer to a second UE, a second base station, a second apparatus, a second device, a second computing system, a second set of one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

Figures 2A, 2B, 2C, 2D:
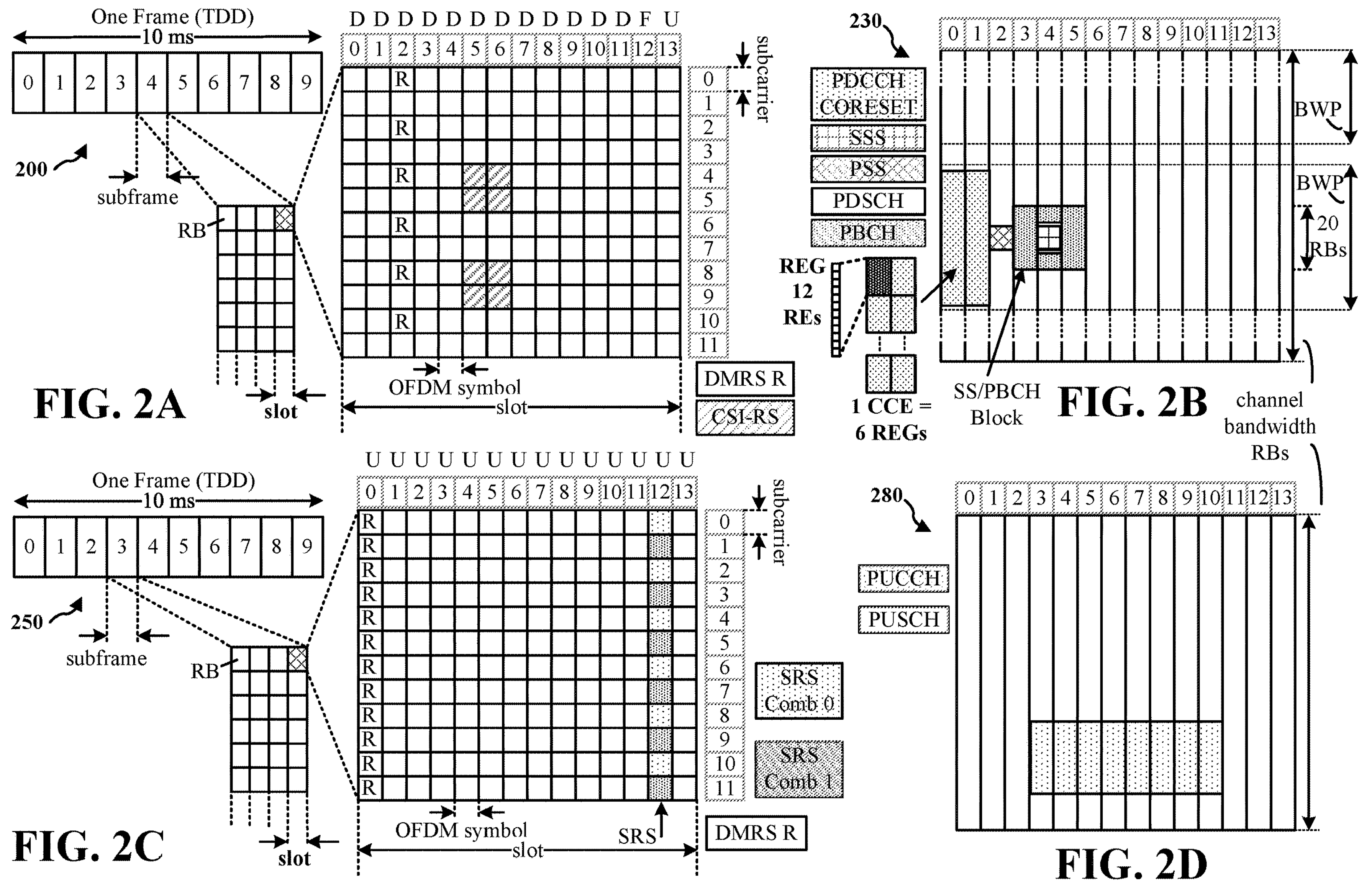
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| $\mu$ | SCS $\Delta f = 2^\mu \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
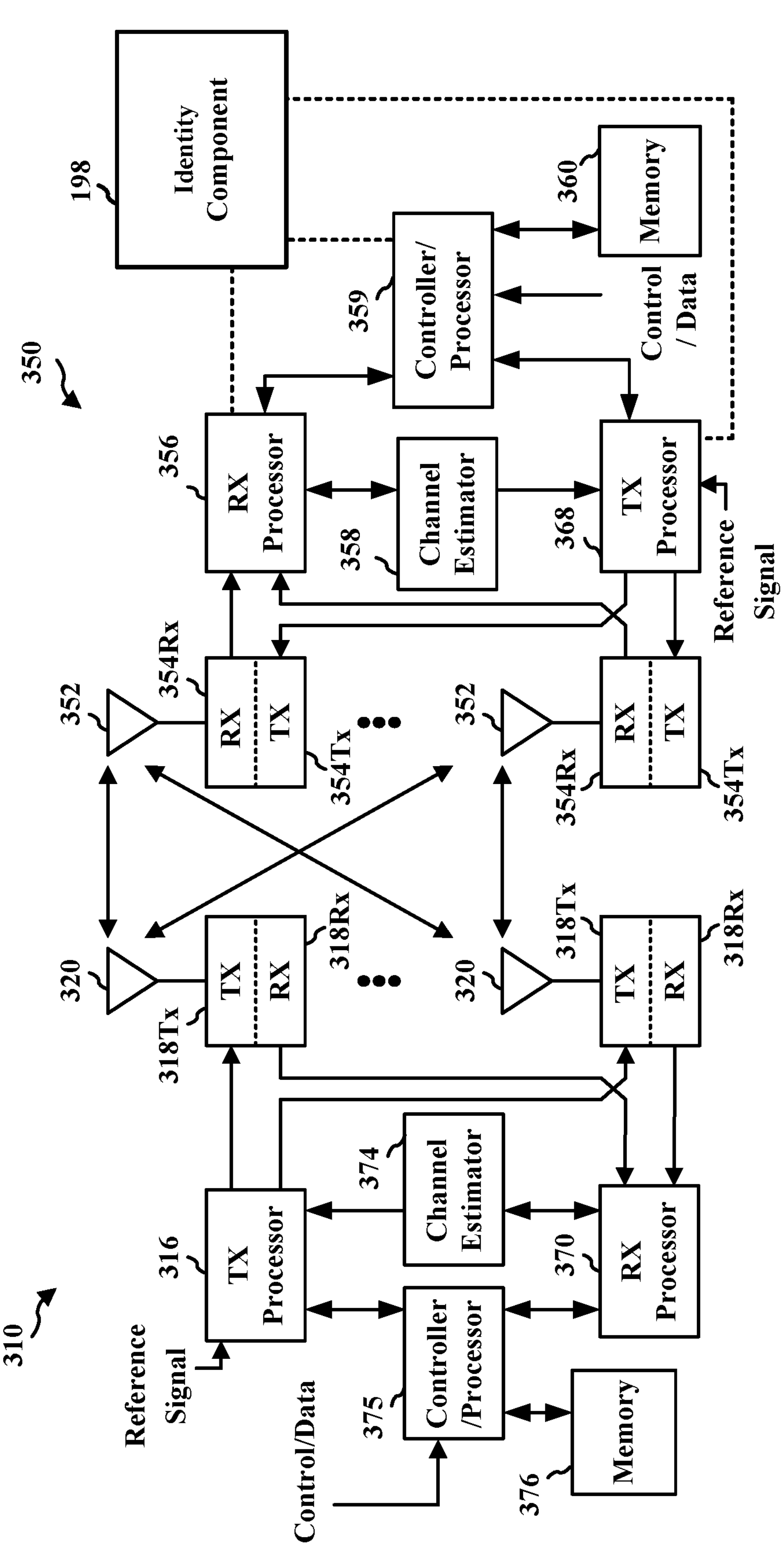
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with identity component 198 of FIG. 1.

As used herein, the term "subscriber identity" or "SUB" may refer to an identity associated with a data subscription service used by the UE so that a network service provider may be able to charge the UE with a cost and provide data connection service to the UE. For example, a subscriber identity may be associated with a subscriber identity module (SIM), embedded SIM, or a different type of identity. As used herein, the term "preferred data subscription" may refer to a data subscription service that is currently preferred by the UE for the purpose of communicating with a network entity. For example, the UE may have a first subscriber identity and a second subscriber identity available for the UE to use, the UE may prefer one of the first subscriber identity and the second subscriber identity and may accordingly communicate with the network based on the preferred data subscription, and may be charged based on the preferred data subscription. In some aspects, based on the preference, the UE may recommend to switch the data subscription and the AP may confirm the switch. As used herein, the term "performance factor" may refer to factors related to performance of a subscriber identity, such as throughput, latency, predictions associated with the throughput, expected throughput, reliability metrics such as signal to interference and noise ratio (SINR), signal to noise ratio (SNR), reference signal received power (RSRP), received signal strength indicator (RSSI), or the like. As used herein, the term "non-performance factor" may refer to factors that relates to a subscriber identity not related to performance, such as cost associated with using the subscriber identity. As used herein, the term "utility function" may refer to a function for calculating a metric (which may be referred to as "utility") for determining whether to determine to recommend to switch the preferred data subscription from one SUB to a different SUB. The utility function may use performance factors and non-performance factors as input for the utility function.

Adaptive Best Access (ABA) is a procedure for subscriber identity selection between subscriber identities (e.g., two different SIMs/eSIMs). Initially, a default data subscription (DDS) may be used as the preferred data subscription and the other subscriber identity may be non-default data subscription (nDDS). Based on ABA, configured throughput of a cell (e.g., based on cell global identity (CGI)) may be recorded per SUB and updated with number of visits. For future visits, the configured throughput is scaled based on a SNR scaling factor where the SNR may be a measure of current condition in order to determine a projected throughput. Projected throughput may be mapped to a measure of utility via a utility function. In ABA, the utility function may be represented by $U(\cdot)$ and may be applied to convert throughput projection into terms that may be more relevant to user experience. As an example, the utility function as $\beta \log(1+tx)$ where t, $\beta$ are parameters and the input to the utility function may be the per-SUB projected throughput, x.

The utilities for both SUBs may be compared with a hysteresis and bias for current DDS SUB to prevent frequent switching of the preferred data subscription. In some aspects, conservative projection of nDDS SUB may be better than aggressive projection of DDS SUB by a margin for a period longer than a threshold for the UE (e.g., a modem at the UE) to recommend determining to recommend to switch the preferred data subscription. In some aspects, the AP may decide to perform the switch based on the recommendation.

As an example, an ABA may provide recommendation of determining to recommend to switch the preferred data subscription if the nDDS SUB becomes preferred SUB. However, if the utility function of ABA does not factor in non-performance factors, the recommendation to switch may recommend a SUB that may be slightly better performing but associated with a much higher cost. Aspects provided herein enables switching preferred data subscription based on both performance factors and non-performance factors to determine the appropriate preferred data subscription, which may result in better performance at the user equipment with non-performance factors factored in.

As an example, a UE may perform calculation based on a utility function and the first step may be receive or determine current SNR for the available air interfaces (e.g., all of the available air interfaces). As a second step, the UE may perform RF condition tracking by computing a discounted SNR:

$$\eta_n = \frac{\log(1+\gamma_n)}{\log(1+\gamma_{max})},$$

where $\gamma_{max}$ is max SNR per air interface category (30 dB) and $\gamma_n$ is SNR associated with a respective air interface. Each subscriber identity may be associated with (e.g., using) one or more air interface(s) to connect to the network at a given time. The UE may keep track of SNR for both DDS and nDDS sub based on first moment tracking: $\overline{\eta_n}=(1-a)\overline{\eta_{n-1}}+a\,\eta_n$, where n=0, 1, 2 . . . ; and second moment tracking:

$$\overline{\eta_n^2} = (1-\alpha)\overline{\eta_{n-1}^2} + \alpha\,\eta_n^2$$

and associated standard deviation estimate:

$$\overline{\sigma_n} = \sqrt{\overline{\eta_n^2} - \overline{\eta_n}^2}.$$

As a third step, the UE may perform throughput projection to determine an aggressive projection of the throughput: $p_+=(\overline{\eta_n}+k\overline{\sigma_n})T$, where T is the configured throughput (e.g., determined based on a data base associated with the subscriber identity and k is scaling factor) or determine an conservative projection of the throughput:

$$p_- = (\overline{\eta_n} - k\overline{\sigma_n})T.$$

In order to perform the switch, the UE may determine switching condition, which may be $$U(P_-^{nDDS}) > U(P_+^{DDS}) + \sigma,$$

where σ represents a threshold parameter, $$P_-^{nDDS}$$

represents conservative configured throughput estimate of nDDS (e.g., the current non-preferred data subscription) and $$P_+^{DDS}$$

represents aggressive configured throughput estimate of the DDS (e.g., the current preferred data subscription), and U represents the utility function. In some aspects, p is the projected throughput per air interface category and P is the projected throughput over all air interface categories of a given subscriber identity. In some aspects where the non-performance factors are not considered, the utility function may be β log (1+tx).

Figure 4:
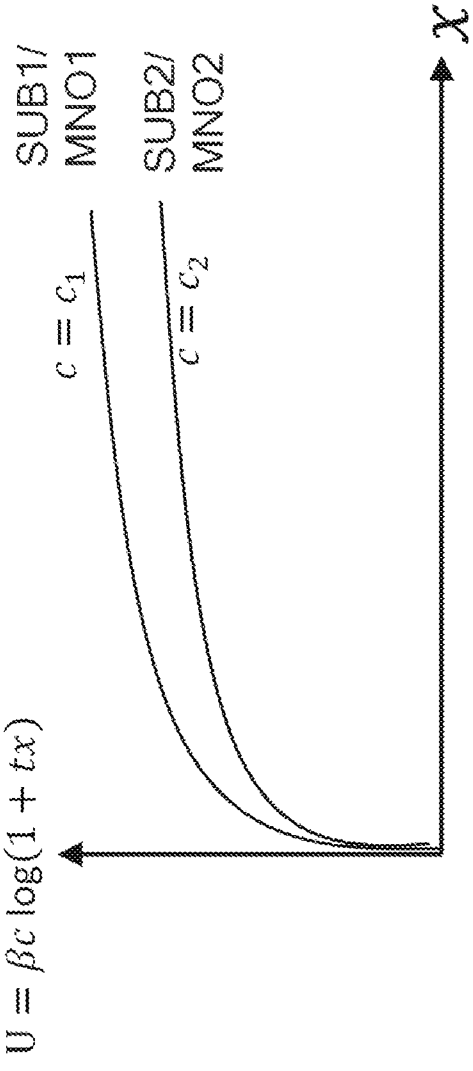
FIG. 4 is a diagram illustrating a first example utility function, where the horizontal axis represents the projected throughput and the vertical axis represents the calculated utility.

In some aspects, in a first example utility function where the non-performance factor(s) is factored in, the utility function may include cost metric considered within the utility metric alongside a projected throughput. For example, the utility function may be U=βc log (1+tx) or U=β log (1+tcx), where c is a cost weight and x the projected throughput, and t, β are parameters configured. FIG. 4 is a diagram 400 illustrating the first example utility function, where the horizontal axis represents the projected throughput and the vertical axis represents the calculated utility.

Figure 5:
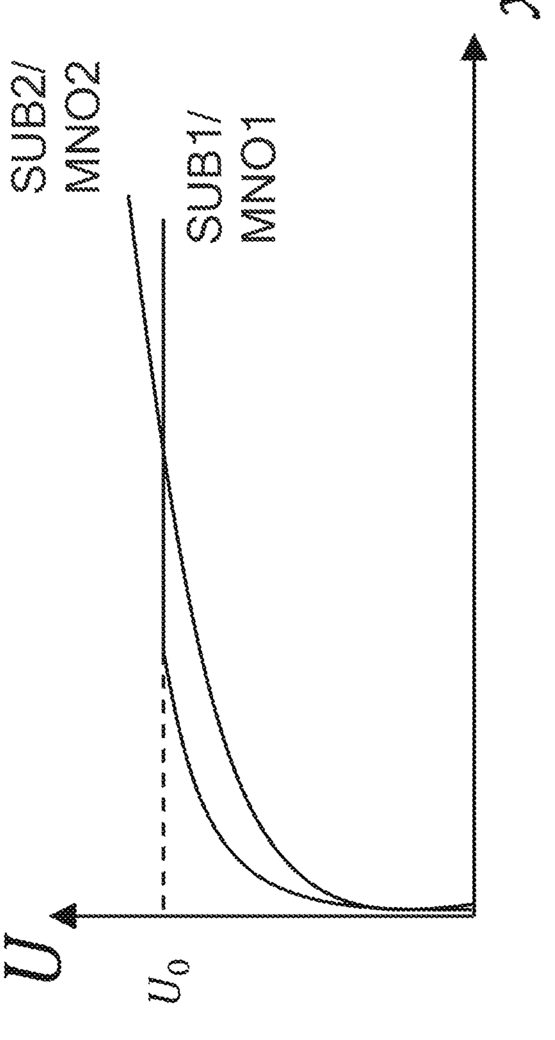
FIG. 5 is a diagram illustrating a second example utility function, where the horizontal axis represents the projected throughput and the vertical axis represents the calculated utility.

In some aspects, in a second example utility function where the non-performance factor(s) is factored in, the utility function may be based on a minimum performance guarantee so that U1=min $\{U_0, \beta \log(1+tx)\}$ and $U_2=\beta \log(1+tx)$. In other words, a lower-cost subscriber identity may be determined to be the preferred data subscription as long as it meets a performance threshold (e.g., based on projected throughput). FIG. 5 is a diagram 500 illustrating the second example utility function, where the horizontal axis represents the projected throughput and the vertical axis represents the calculated utility. As illustrated in FIG. 5, as long as the minimum calculated utility is met, the lower-cost subscriber identity may be preferred.

In some aspects, in a third example utility function where the non-performance factor(s) is factored in, a hysteresis value may be applied to respective subscriber identity to account for the respective non-performance factors (e.g., costs). For example, when determining whether to switch from the first subscriber identity to the second subscriber identity, hysteresis H1 (e.g., $$H_1')$$

may be applied. When determining whether to switch from the second subscriber identity to the first subscriber identity, hysteresis H2 (e.g., $$H_2')$$

may be applied. The utility function may be:

$$U_1' = H_1' + \beta\ \log(1+tx),\ U_2' = H_2' + \beta\ \log(1+tx),$$

where $$H_1' < H_2'.$$

In other words, the second subscriber identity with a higher cost may contribute additional performance of ΔH in order to become the preferred data subscription. The values of H1 and H2 may be configured by the network.

In some aspects, in a fourth example utility function where the non-performance factor(s) is factored in, conservative-aggressive re-assignment may be used. For example, in order to recommend to switch to the nDDS, the conservative projection of nDDS subscriber identity may be better than aggressive projection of DDS SUB by a margin (e.g., a margin larger than a threshold) for a period (e.g., a period larger than a time threshold). One example of accounting for the non-performance factors (e.g., cost) of the different subscriber identities may be defining $C_1$ and $C_2$ to be the non-performance metrics (e.g., cost metrics) associated with SUB1/MNO1 (nDDS sub) and SUB2/MNO2 (DDS sub), respectively. If $C_1 \geq C_2$, a baseline algorithm of conservative utility calculation (based on performance factors without non-performance factors) for nDDS and aggressive utility calculation (based on performance factors without non-performance factors) for DDS may be used. If $C_1 < C_2$, the conservative and aggressive utility assignment of the different subscriber identities may be changed based on:

TABLE 2

| | nDDS utility | DDS utility |
|---|---|---|
| $C_1 \geq C_2$ (baseline ABA) | Conservative | Aggressive |
| $0 < C_2 - C_1 \leq C_{th}$, $C_{th}$ may be configured threshold. | Conservative (Aggressive) | Conservative (Aggressive) |
| $C_{th} < C2 - C1$ | Aggressive | Conservative |

In some aspects, in a fifth example utility function where the non-performance factor(s) is factored in, a conservative/aggressive scaling factor may be factored. For example, the non-performance factors may be used for determining whether to use aggressive or conservative projection when comparing utility for a particular subscriber identity. As an example, a scaling function may be based on a cost metric, C, for nDDS, k(C) may be a monotonically increasing function (e.g., the higher the subscription cost, the more conservative projection for nDDS sub) and for DDS, k(C) may be a monotonically decreasing function (e.g., the higher the subscription cost, the less aggressive projection for DDS sub). FIG. 6 is a diagram 600 illustrating the fifth example utility function, where the horizontal axis represents the projected throughput and the vertical axis represents the calculated utility.

Figure 7:
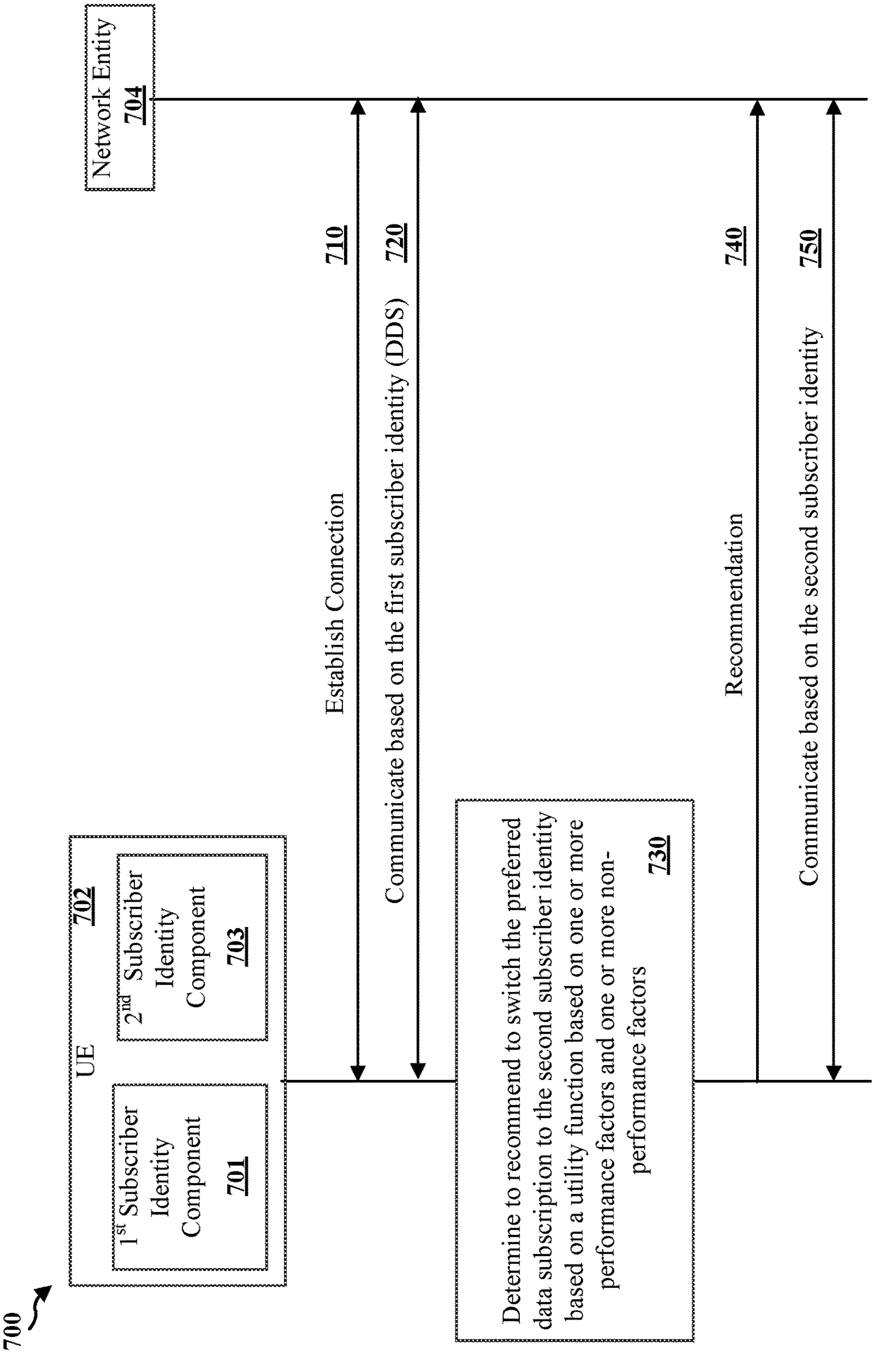
FIG. 7 is a diagram illustrating example communications between a network entity and a UE.

FIG. 7 is a diagram 700 illustrating example communications between a network entity 704 and a UE 702 having a first subscriber identify component 701 and a second subscriber identify component 703.

At 710, the UE 702 may establish a connection with the network entity 704 based on a first subscriber identity (e.g., and the first subscriber identity component 701) and a second subscriber identity (e.g., and the second subscriber identity component 703). At 720, the UE 702 may communicate with the network entity 704 based on the first subscriber identity based on the first subscriber identity being a preferred data subscription. At 730, the UE 702 determine to recommend to switch the preferred data subscription to the second subscriber identity based on a utility function based on one or more performance factors and one or more non-performance factors (e.g., the first example utility function, the second example utility function, the third example utility function, the fourth example utility function, or the fifth example utility function described herein). Based on determining to switch the preferred data subscription, the UE 702 may transmit a recommendation 740, which may be in turn confirmed by the network entity 704 (or the AP). At 750, the UE 702 may use the second subscriber identity as the preferred data subscription for data service associated with the UE to communicate with the network entity 704.

Figure 8:
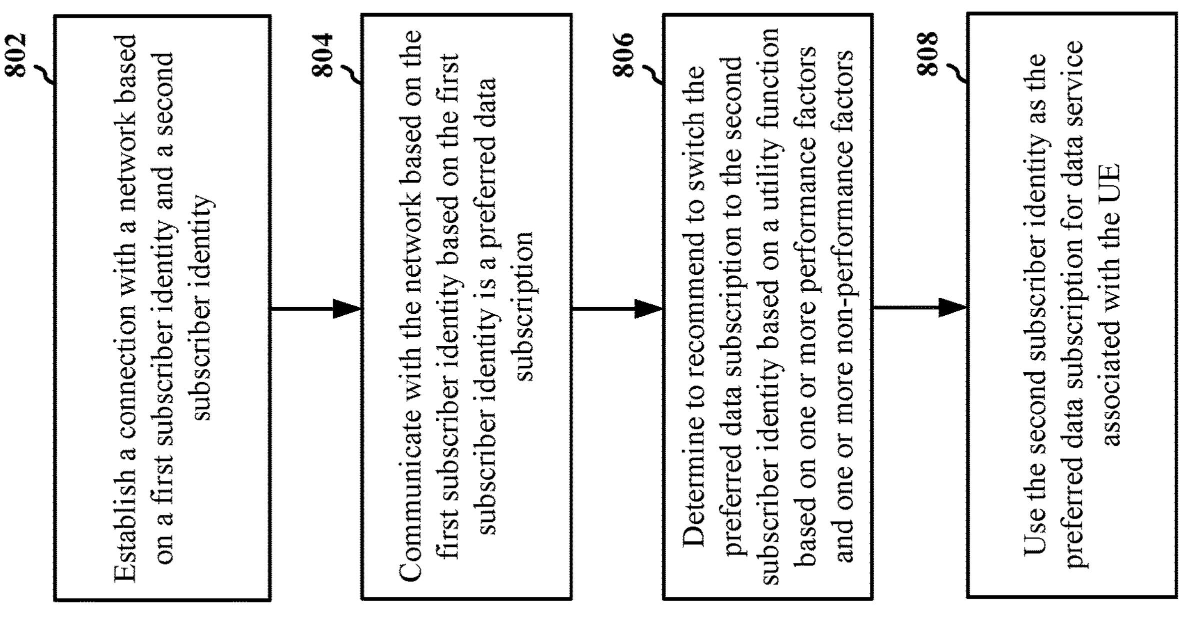
FIG. 8 is a flowchart of a method of wireless communication.
Figure 8:
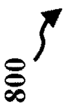

FIG. 8 is a flowchart 800 of a method of wireless communication. The method may be performed by a UE (e.g., the UE 104, the UE 702; the apparatus 904). The method may enable switching preferred data subscription based on both performance factors and non-performance factors to determine the appropriate preferred data subscription, which may result in better performance at the user equipment with non-performance factors factored in.

Figure 9:
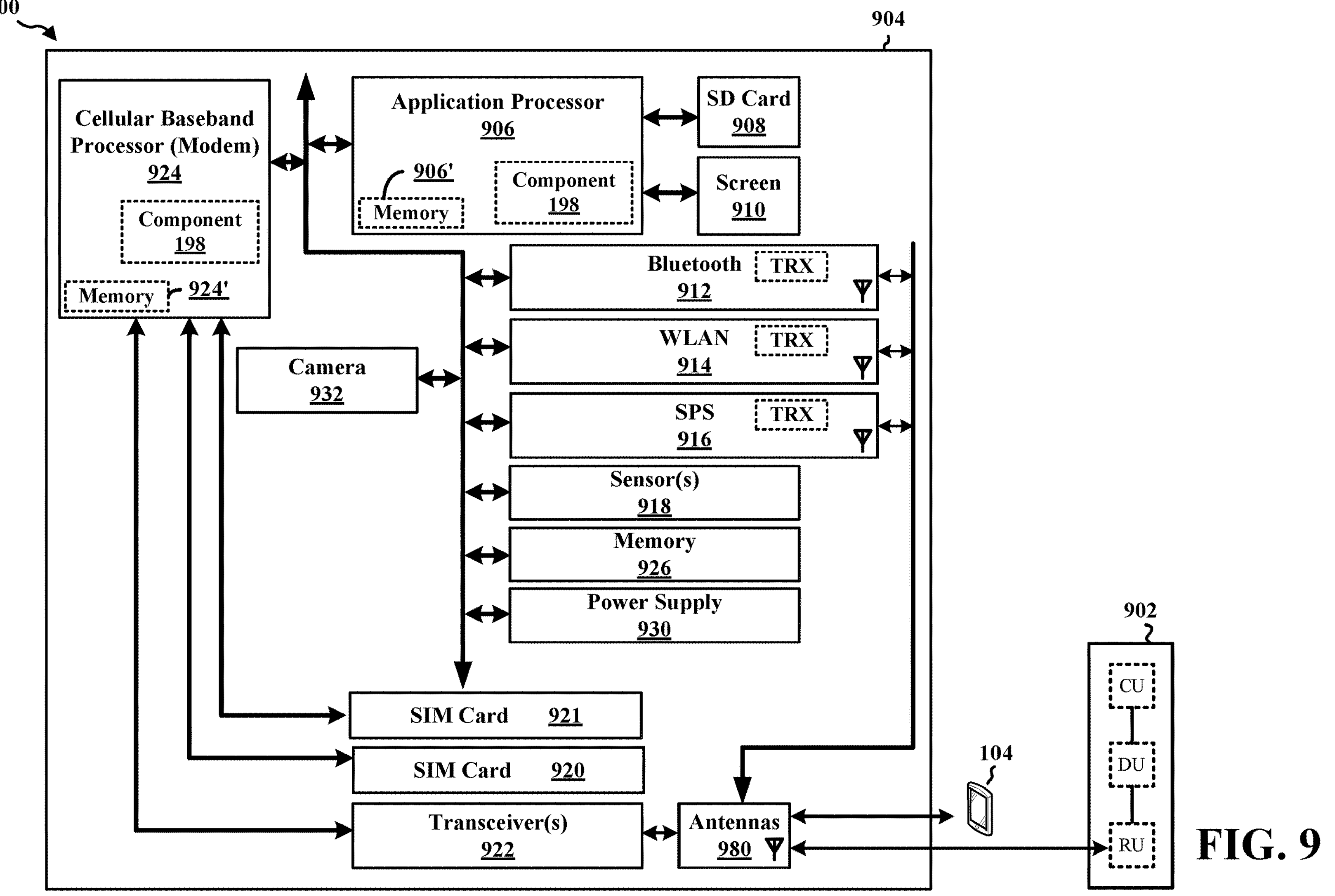
FIG. 9 is a diagram illustrating an example of a hardware implementation for an example apparatus and/or network entity.

At 802, the UE may establish a connection with a network based on a first subscriber identity and a second subscriber identity. For example, the UE 702 may establish a connection (e.g., at 710) with a network based on a first subscriber identity and a second subscriber identity. As illustrated in FIG. 7, the UE 702 may include a first subscriber identity component 701 and a second subscriber identity component 703. FIG. 9 illustrates an example apparatus 904 that includes multiple SIM cards, e.g., 920 and 921. In some aspects, the first subscriber identity may be associated with a first SIM card (e.g., 920), and the second subscriber identity may be associated with a second SIM card (e.g., 921). In some aspects, 802 may be performed by identity component 198.

At 804, the UE may communicate with the network based on the first subscriber identity based on the first subscriber identity being a preferred data subscription. For example, the UE 702 may communicate (e.g., at 720) with the network based on the first subscriber identity based on the first subscriber identity being a preferred data subscription. In some aspects, 804 may be performed by identity component 198.

At 806, the UE may determine to recommend to switch the preferred data subscription to the second subscriber identity based on a utility function based on one or more performance factors and one or more non-performance factors. For example, the UE 702 may determine (e.g., at 730) to recommend to switch the preferred data subscription to the second subscriber identity based on a utility function based on one or more performance factors and one or more non-performance factors. In some aspects, 806 may be performed by identity component 198.

At 808, the UE may use the second subscriber identity as the preferred data subscription for data service associated with the UE. For example, the UE 702 may use (e.g., at 750) the second subscriber identity as the preferred data subscription for data service associated with the UE. In some aspects, 808 may be performed by identity component 198.

In some aspects, the utility function is based on a product of the one or more performance factors and the one or more non-performance factors, and where the one or more performance factors includes a respective expected throughput associated with the second subscriber identity or the first subscriber identity and the one or more non-performance factors includes a respective cost associated with the second subscriber identity or the first subscriber identity, and where to determine to recommend to switch the preferred data subscription to the second subscriber identity, the UE may calculate a first utility associated with the first subscriber identity based on the utility function; calculate a second utility associated with the second subscriber identity based on the utility function; and determine to recommend to switch the preferred data subscription to the second subscriber identity based on the first utility being lower than the second utility. In some aspects, the utility function is based on $\beta c \log(1+tx)$ or $\beta \log(1+tcx)$, where $\beta$ is a first adjustable parameter, t is a second adjustable parameter, c is the cost, and x is the throughput.

In some aspects, the utility function is based on satisfaction of a threshold associated with the one or more performance factors and then considering the one or more non-performance factors, and where the one or more performance factors includes a respective expected throughput associated with the second subscriber identity or the first subscriber identity and the one or more non-performance factors includes a respective cost associated with the second subscriber identity or the first subscriber identity, and where, the UE may determine to recommend to switch the preferred data subscription to the second subscriber identity based on the second subscriber identity satisfying the threshold associated with the one or more performance factors; and an association of the second subscriber identity with a lower cost than the first subscriber identity.

In some aspects, the utility function is based on a calculation of a utility based on the one or more performance factors and application of a respective hysteresis value based on the one or more non-performance factors, and where the one or more performance factors includes a respective expected throughput associated with the second subscriber identity or the first subscriber identity and the one or more non-performance factors includes a respective cost associated with the second subscriber identity or the first subscriber identity. In some aspects, the utility function is based on $H'+\beta \log(1+tx)$, where $\beta$ is a first adjustable parameter, t is a second adjustable parameter, x is the throughput, and H' is the hysteresis value.

In some aspects, the one or more performance factors includes a respective expected throughput associated with the second subscriber identity or the first subscriber identity and the one or more non-performance factors includes a respective cost associated with the second subscriber identity or the first subscriber identity, and where to determine to recommend to determine to recommend to switch the preferred data subscription to the second subscriber identity, the UE may: (1) if a first cost associated with the first subscriber identity is larger than or equal to a second cost associated with the second subscriber identity, determine to recommend to switch the preferred data subscription to the second subscriber identity based on a conservative projection associated with the second subscriber identity based on the utility function is better than an aggressive projection associated with the first subscriber identity based on the utility function for a period of time larger than a time threshold; (2) if the first cost associated with the first subscriber identity is smaller than the second cost associated with the second subscriber identity by less than a threshold, determine to recommend to switch the preferred data subscription to the second subscriber identity based on the conservative projection associated with the second subscriber identity based on the utility function is better than a second conservative projection associated with the first subscriber identity based on the utility function for a period of time larger than the time threshold; or (3) if the first cost associated with the first subscriber identity is smaller than the second cost associated with the second subscriber identity by more than the threshold, determine to recommend to switch the preferred data subscription to the second subscriber identity based on a second aggressive projection associated with the second subscriber identity based on the utility function is better than the second conservative projection associated with the first subscriber identity based on the utility function for a period of time larger than the time threshold.

In some aspects, the UE may determine to recommend to switch the preferred data subscription to the second subscriber identity based on a conservative projection associated with the second subscriber identity, which is based on the utility function, being better than an aggressive projection associated with the first subscriber identity, which is based on the utility function, for a period of time larger than a time threshold, and where the one or more non-performance factors correspond to respective scaling factors associated with the conservative projection and the aggressive projection. In some aspects, to use the second subscriber as the preferred data subscription for the data service associated with the UE, the UE may render a graphics component for confirming the preferred data subscription on a screen associated with the UE. In some aspects, the UE may transmit a recommendation for switch to the preferred data subscription for the purpose of communicating with the network.

FIG. 9 is a diagram 900 illustrating an example of a hardware implementation for an apparatus 904. The apparatus 904 may be a UE, a component of a UE, or may implement UE functionality. In some aspects, the apparatus 904 may include at least one cellular baseband processor 924 (also referred to as a modem) coupled to one or more transceivers 922 (e.g., cellular RF transceiver). The cellular baseband processor(s) 924 may include at least one on-chip memory 924'. In some aspects, the apparatus 904 may further include one or more subscriber identity modules (SIM) cards 920, 921 and at least one application processor 906 coupled to a secure digital (SD) card 908 and a screen 910. The application processor(s) 906 may include on-chip memory 906'. In some aspects, the apparatus 904 may further include a Bluetooth module 912, a WLAN module 914, an SPS module 916 (e.g., GNSS module), one or more sensor modules 918 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 926, a power supply 930, and/or a camera 932. The Bluetooth module 912, the WLAN module 914, and the SPS module 916 may include an on-chip transceiver (TRX) (or in some cases, just a receiver (RX)). The Bluetooth module 912, the WLAN module 914, and the SPS module 916 may include their own dedicated antennas and/or utilize the antennas 980 for communication. The cellular baseband processor(s) 924 communicates through the transceiver(s) 922 via one or more antennas 980 with the UE 104 and/or with an RU associated with a network entity 902. The cellular baseband processor(s) 924 and the application processor(s) 906 may each include a computer-readable medium/memory 924', 906', respectively. The additional memory modules 926 may also be considered a computer-readable medium/memory. Each computer-readable medium/memory 924', 906', 926 may be non-transitory. The cellular baseband processor(s) 924 and the application processor(s) 906 are each responsible for general processing, including the execution of software stored on the computer-readable medium/memory. The software, when executed by the cellular baseband processor(s) 924/application processor(s) 906, causes the cellular baseband processor(s) 924/application processor(s) 906 to perform the various functions described supra. The computer-readable medium/memory may also be used for storing data that is manipulated by the cellular baseband processor(s) 924/application processor(s) 906 when executing software. The cellular baseband processor(s) 924/application processor(s) 906 may be a component of the UE 350 and may include the at least one memory 360 and/or at least one of the TX processor 368, the RX processor 356, and the controller/processor 359. In one configuration, the apparatus 904 may be at least one processor chip (modem and/or application) and include just the cellular baseband processor(s) 924 and/or the application processor(s) 906, and in another configuration, the apparatus 904 may be the entire UE (e.g., see UE 350 of FIG. 3) and include the additional modules of the apparatus 904.

As discussed supra, the identity component 198 may be configured to establish a connection with a network based on a first subscriber identity and a second subscriber identity. In some aspects, the identity component 198 may be further configured to communicate with the network based on the first subscriber identity based on the first subscriber identity being a preferred data subscription. In some aspects, the identity component 198 may be further configured to determine to recommend to switch the preferred data subscription to the second subscriber identity based on a utility function based on one or more performance factors and one or more non-performance factors. In some aspects, the identity component 198 may be further configured to use the second subscriber identity as the preferred data subscription for data service associated with the UE. The identity component 198 may be within the cellular baseband processor(s) 924, the application processor(s) 906, or both the cellular baseband processor(s) 924 and the application processor(s) 906. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 904 may include a variety of components configured for various functions. In one configuration, the apparatus 904, and in particular the cellular baseband processor(s) 924 and/or the application processor(s) 906, may include means for establishing a connection with a network based on a first subscriber identity and a second subscriber identity. In some aspects, the apparatus 904 may include means for communicating with the network based on the first subscriber identity based on the first subscriber identity being a preferred data subscription. In some aspects, the apparatus 904 may include means for determining to recommend to switch the preferred data subscription to the second subscriber identity based on a utility function based on one or more performance factors and one or more non-performance factors. In some aspects, the apparatus 904 may include means for using the second subscriber identity as the preferred data subscription for data service associated with the UE. In some aspects, the apparatus 904 may include means for calculating a first utility associated with the first subscriber identity based on the utility function. In some aspects, the apparatus 904 may include means for calculating a second utility associated with the second subscriber identity based on the utility function. In some aspects, the apparatus 904 may include means for determining to recommend to switch the preferred data subscription to the second subscriber identity based on the first utility being lower than the second utility. In some aspects, the apparatus 904 may include means for determining to recommend to switch the preferred data subscription to the second subscriber identity based on a conservative projection associated with the second subscriber identity based on the utility function is better than an aggressive projection associated with the first subscriber identity based on the utility function for a period of time larger than a time threshold if a first cost associated with the first subscriber identity is larger than or equal to a second cost associated with the second subscriber identity. In some aspects, the apparatus 904 may include means for determining to recommend to switch the preferred data subscription to the second subscriber identity based on the conservative projection associated with the second subscriber identity based on the utility function is better than a second conservative projection associated with the first subscriber identity based on the utility function for a period of time larger than the time threshold if the first cost associated with the first subscriber identity is smaller than the second cost associated with the second subscriber identity by less than a threshold. In some aspects, the apparatus 904 may include means for determining to recommend to switch the preferred data subscription to the second subscriber identity based on a second aggressive projection associated with the second subscriber identity based on the utility function is better than the second conservative projection associated with the first subscriber identity based on the utility function for a period of time larger than the time threshold if the first cost associated with the first subscriber identity is smaller than the second cost associated with the second subscriber identity by more than the threshold. In some aspects, the apparatus 904 may include means for determining to recommend to switch the preferred data subscription to the second subscriber identity based on a conservative projection associated with the second subscriber identity, which is based on the utility function, being better than an aggressive projection associated with the first subscriber identity, which is based on the utility function, for a period of time larger than a time threshold, and where the one or more non-performance factors correspond to respective scaling factors associated with the conservative projection and the aggressive projection. In some aspects, the apparatus 904 may include means for rendering a graphics component for confirming the preferred data subscription on a screen associated with the UE. The means may be the component 198 of the apparatus 904 configured to perform the functions recited by the means. As described supra, the apparatus 904 may include the TX processor 368, the RX processor 356, and the controller/processor 359. As such, in one configuration, the means may be the TX processor 368, the RX processor 356, and/or the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B. A and C, B and C, or A and B and C, where any such combinations may contain one or more member or members of A, B, or C. Sets should be interpreted as a set of elements where the elements number one or more. Accordingly, for a set of X. X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method for wireless communication performed by a user equipment (UE), including: establishing a connection with a network based on a first subscriber identity and a second subscriber identity; communicating with the network based on the first subscriber identity based on the first subscriber identity being a preferred data subscription; determining to recommend to switch the preferred data subscription to the second subscriber identity based on a utility function based on one or more performance factors and one or more non-performance factors; and using the second subscriber identity as the preferred data subscription for data service associated with the UE.

Aspect 2 is the method of aspect 1, where the utility function is based on a product of the one or more performance factors and the one or more non-performance factors, and where the one or more performance factors includes a respective expected throughput associated with the second subscriber identity or the first subscriber identity and the one or more non-performance factors includes a respective cost associated with the second subscriber identity or the first subscriber identity, and where determining to recommend to switch the preferred data subscription to the second subscriber identity further includes: calculating a first utility associated with the first subscriber identity based on the utility function; calculating a second utility associated with the second subscriber identity based on the utility function; and determining to recommend to switch the preferred data subscription to the second subscriber identity based on the first utility being lower than the second utility.

Aspect 3 is the method of aspect 2, where the utility function is based on $\beta c \log(1+tx)$ or $\beta \log(1+tcx)$, where $\beta$ is a first adjustable parameter, t is a second adjustable parameter, c is a cost, and x is a throughput.

Aspect 4 is the method of aspect 1, where the utility function is based on satisfaction of a threshold associated with the one or more performance factors and then considering the one or more non-performance factors, and where the one or more performance factors includes a respective expected throughput associated with the second subscriber identity or the first subscriber identity and the one or more non-performance factors includes a respective cost associated with the second subscriber identity or the first subscriber identity, and where determining to recommend to switch the preferred data subscription to the second subscriber identity is based on the second subscriber identity satisfying the threshold associated with the one or more performance factors; and an association of the second subscriber identity with a lower cost than the first subscriber identity.

Aspect 5 is the method of aspect 1, where the utility function is based on a calculation of a utility based on the one or more performance factors and application of a respective hysteresis value based on the one or more non-performance factors, and where the one or more performance factors includes a respective expected throughput associated with the second subscriber identity or the first subscriber identity and the one or more non-performance factors includes a respective cost associated with the second subscriber identity or the first subscriber identity.

Aspect 16 is the method of aspect 15, where the utility function is based on $H'+\beta \log(1+tx)$, where $\beta$ is a first adjustable parameter, t is a second adjustable parameter, x is a throughput, and H' is a hysteresis value.

Aspect 7 is the method of aspect 1, where the one or more performance factors includes a respective expected throughput associated with the second subscriber identity or the first subscriber identity and the one or more non-performance factors includes a respective cost associated with the second subscriber identity or the first subscriber identity, and where determining to recommend to determine to recommend to switch the preferred data subscription to the second subscriber identity further includes: if a first cost associated with the first subscriber identity is larger than or equal to a second cost associated with the second subscriber identity, determining to recommend to switch the preferred data subscription to the second subscriber identity based on a conservative projection associated with the second subscriber identity based on the utility function is better than an aggressive projection associated with the first subscriber identity based on the utility function for a period of time larger than a time threshold; if the first cost associated with the first subscriber identity is smaller than the second cost associated with the second subscriber identity by less than a threshold, determining to recommend to switch the preferred data subscription to the second subscriber identity based on the conservative projection associated with the second subscriber identity based on the utility function is better than a second conservative projection associated with the first subscriber identity based on the utility function or based on the aggressive projection associated with the first subscriber identity is better than a second aggressive projection associated with the second subscriber identity based on the utility function for the period of time larger than the time threshold; or if the first cost associated with the first subscriber identity is smaller than the second cost associated with the second subscriber identity by more than the threshold, determining to recommend to switch the preferred data subscription to the second subscriber identity based on the second aggressive projection associated with the second subscriber identity based on the utility function is better than the second conservative projection associated with the first subscriber identity based on the utility function for the period of time larger than the time threshold.

Aspect 8 is the method of aspect 1, further including determining to recommend to switch the preferred data subscription to the second subscriber identity based on a conservative projection associated with the second subscriber identity, which is based on the utility function, being better than an aggressive projection associated with the first subscriber identity, which is based on the utility function, for a period of time larger than a time threshold, and where the one or more non-performance factors correspond to respective scaling factors associated with the conservative projection and the aggressive projection.

Aspect 9 is the method of any of aspects 1-8, where using the second subscriber identity as the preferred data subscription for the data service associated with the UE further includes: rendering a graphics component for confirming the preferred data subscription on a screen associated with the UE.

Aspect 10 is an apparatus for wireless communication at a device including at least one memory and at least one processor coupled to the at least one memory and, the at least one processor, individually or in any combination, based at least in part on information stored in the at least one memory, the at least one processor is configured to implement any of aspects 1 to 9.

Aspect 11 is the apparatus of aspect 10, further including one or more transceivers or one or more antennas coupled to the at least one processor.

Aspect 12 is an apparatus for wireless communication at a device including means for implementing any of aspects 1 to 9.

Aspect 13 is a computer-readable medium (e.g., a non-transitory computer-readable medium) storing computer executable code, where the code when executed by at least one processor causes the at least one processor to implement any of aspects 1 to 9.

What is claimed is:

1. An apparatus for wireless communication at a user equipment (UE), comprising:

at least one memory; and at least one processor coupled to the at least one memory and, based at least in part on stored information that is stored in the at least one memory, the at least one processor is configured to cause the UE to:

establish a connection with a network based on a first subscriber identity and a second subscriber identity;

communicate with the network based on the first subscriber identity based on the first subscriber identity being a preferred data subscription;

calculate a first utility associated with the first subscriber identity based on a utility function;

calculate a second utility associated with the second subscriber identity based on the utility function, wherein the utility function is based on a product of one or more performance factors and one or more non-performance factors, and wherein the one or more performance factors comprises a respective expected throughput associated with the second subscriber identity or the first subscriber identity and the one or more non-performance factors comprises a respective cost associated with the second subscriber identity or the first subscriber identity;

determine to recommend to switch the preferred data subscription to the second subscriber identity based on the first utility being lower than the second utility;

use the second subscriber identity as the preferred data subscription for data service associated with the UE.

2. The apparatus of claim 1, wherein the utility function is based on $\beta c \log(1+tx)$ or $\beta \log(1+tcx)$, wherein $\beta$ is a first adjustable parameter, t is a second adjustable parameter, c is a cost, and x is a throughput.

3. The apparatus of claim 1, wherein to use the second subscriber identity as the preferred data subscription for the data service associated with the UE, the at least one processor is configured to cause the UE to:

render a graphics component for confirming the preferred data subscription on a screen associated with the UE.

4. An apparatus for wireless communication at a user equipment (UE), comprising:

at least one memory; and at least one processor coupled to the at least one memory and, based at least in part on stored information that is stored in the at least one memory, the at least one processor is configured to cause the UE to:

establish a connection with a network based on a first subscriber identity and a second subscriber identity;

communicate with the network based on the first subscriber identity based on the first subscriber identity being a preferred data subscription;

determine to switch the preferred data subscription to the second subscriber identity based on the second subscriber identity satisfying a threshold associated with one or more performance factors, a utility function, and an association of the second subscriber identity with a lower cost than the first subscriber identity, wherein the utility function is based on satisfaction of a threshold associated with the one or more performance factors and then considering one or more non-performance factors, and wherein the one or more performance factors comprises a respective expected throughput associated with the second subscriber identity or the first subscriber identity and the one or more non-performance factors comprises a respective cost associated with the second subscriber identity or the first subscriber identity; and use the second subscriber identity as the preferred data subscription for data service associated with the UE.

5. The apparatus of claim 4, wherein to use the second subscriber identity as the preferred data subscription for the data service associated with the UE, the at least one processor is configured to cause the UE to:

render a graphics component for confirming the preferred data subscription on a screen associated with the UE.

6. An apparatus for wireless communication at a user equipment (UE), comprising:

at least one memory; and at least one processor coupled to the at least one memory and, based at least in part on stored information that is stored in the at least one memory, the at least one processor is configured to cause the UE to:

establish a connection with a network based on a first subscriber identity and a second subscriber identity;

communicate with the network based on the first subscriber identity based on the first subscriber identity being a preferred data subscription, determine to recommend to switch the preferred data subscription to the second subscriber identity based on a utility function based on one or more performance factors and one or more non-performance factors, wherein the utility function is based on a calculation of a utility based on the one or more performance factors and application of a respective hysteresis value based on the one or more non-performance factors, and wherein the one or more performance factors comprises a respective expected throughput associated with the second subscriber identity or the first subscriber identity and the one or more non-performance factors comprises a respective cost associated with the second subscriber identity or the first subscriber identity; and use the second subscriber identity as the preferred data subscription for data service associated with the UE.

7. The apparatus of claim 6, wherein the utility function is based on $H'+\beta \log(1+tx)$, wherein $\beta$ is a first adjustable parameter, t is a second adjustable parameter, x is a throughput, and H' is a hysteresis value.

8. The apparatus of claim 6, wherein to use the second subscriber identity as the preferred data subscription for the data service associated with the UE, the at least one processor is configured to cause the UE to:

render a graphics component for confirming the preferred data subscription on a screen associated with the UE.

9. An apparatus for wireless communication at a user equipment (UE), comprising:

at least one memory; and at least one processor coupled to the at least one memory and, based at least in part on stored information that is stored in the at least one memory, the at least one processor is configured to cause the UE to:

establish a connection with a network based on a first subscriber identity and a second subscriber identity;

communicate with the network based on the first subscriber identity based on the first subscriber identity being a preferred data subscription;

determine to recommend to switch the preferred data subscription to the second subscriber identity based on a utility function based on one or more performance factors and one or more non-performance factors, wherein the one or more performance factors comprises a respective expected throughput associated with the second subscriber identity or the first subscriber identity and the one or more non-performance factors comprises a respective cost associated with the second subscriber identity or the first subscriber identity, if a first cost associated with the first subscriber identity is larger than or equal to a second cost associated with the second subscriber identity, determine to recommend to switch the preferred data subscription to the second subscriber identity based on a conservative projection associated with the second subscriber identity based on the utility function is better than an aggressive projection associated with the first subscriber identity based on the utility function for t period of time larger than a time threshold;

if the first cost associated with the first subscriber identity is smaller than the second cost associated with the second subscriber identity by less than a threshold, determine to recommend to switch the preferred data subscription to the second subscriber identity based on the conservative projection associated with the second subscriber identity based on the utility function is better than a second conservative projection associated with the first subscriber identity based on the utility function or based on the aggressive projection associated with the first subscriber identity is better than a second aggressive projection associated with the second subscriber identity based on the utility function for the period of time larger than the time threshold; or if the first cost associated with the first subscriber identity is smaller than the second cost associated with the second subscriber identity by more than the threshold, determine to recommend to switch the preferred data subscription to the second subscriber identity based on the second aggressive projection associated with the second subscriber identity based on the utility function is better than the second conservative projection associated with the first subscriber identity based on the utility function for the period of time larger than the time threshold; and use the second subscriber identity as the preferred data subscription for data service associated with the UE.

10. The apparatus of claim 9, wherein to use the second subscriber identity as the preferred data subscription for the data service associated with the UE, the at least one processor is configured to cause the UE to:

render a graphics component for confirming the preferred data subscription on a screen associated with the UE.

11. An apparatus for wireless communication at a user equipment (UE), comprising:

at least one memory; and at least one processor coupled to the at least one memory and, based at least in part on stored information that is stored in the at least one memory, the at least one processor is configured to cause the UE to:

establish a connection with a network based on a first subscriber identity and a second subscriber identity;

communicate with the network based on the first subscriber identity based on the first subscriber identity being a preferred data subscription;

determine to recommend to switch the preferred data subscription to the second subscriber identity based on a conservative projection associated with the second subscriber identity, which is based on a utility function based on one or more performance factors and one or more non-performance factors, being better than an aggressive projection associated with the first subscriber identity, which is based on the utility function, for a period of time larger than a time threshold, and wherein the one or more non-performance factors correspond to respective scaling factors associated with the conservative projection and the aggressive projection; and use the second subscriber identity as the preferred data subscription for data service associated with the UE.

12. The apparatus of claim 11, wherein to use the second subscriber identity as the preferred data subscription for the data service associated with the UE, the at least one processor is configured to cause the UE to:

render a graphics component for confirming the preferred data subscription on a screen associated with the UE.

* * * * *